Sept. 21, 1943.   T. ZUSCHLAG   2,329,812
ELECTROMAGNETIC INSPECTION WITH ALTERNATING CURRENT
Filed Dec. 5, 1941
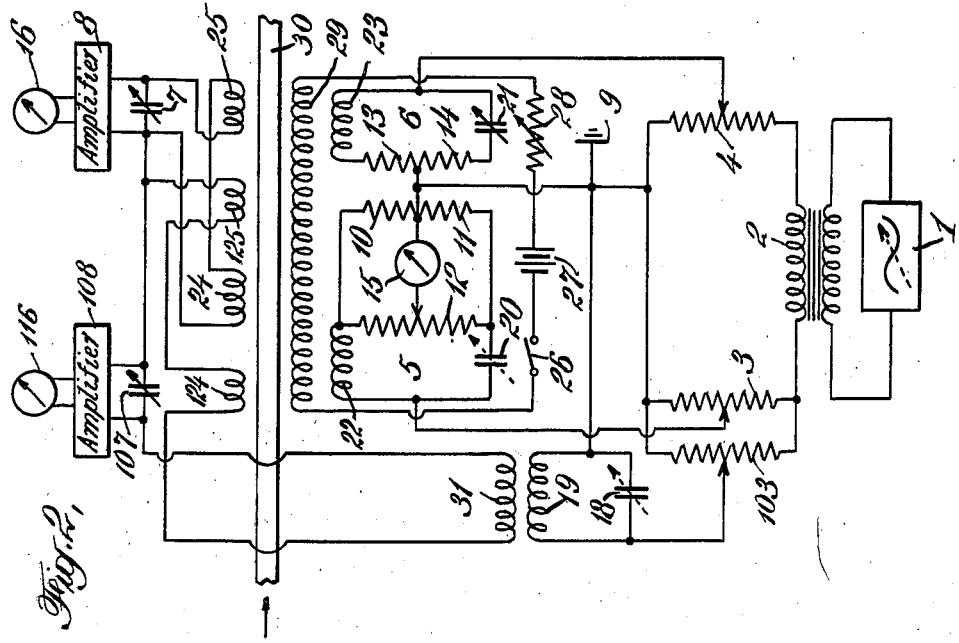
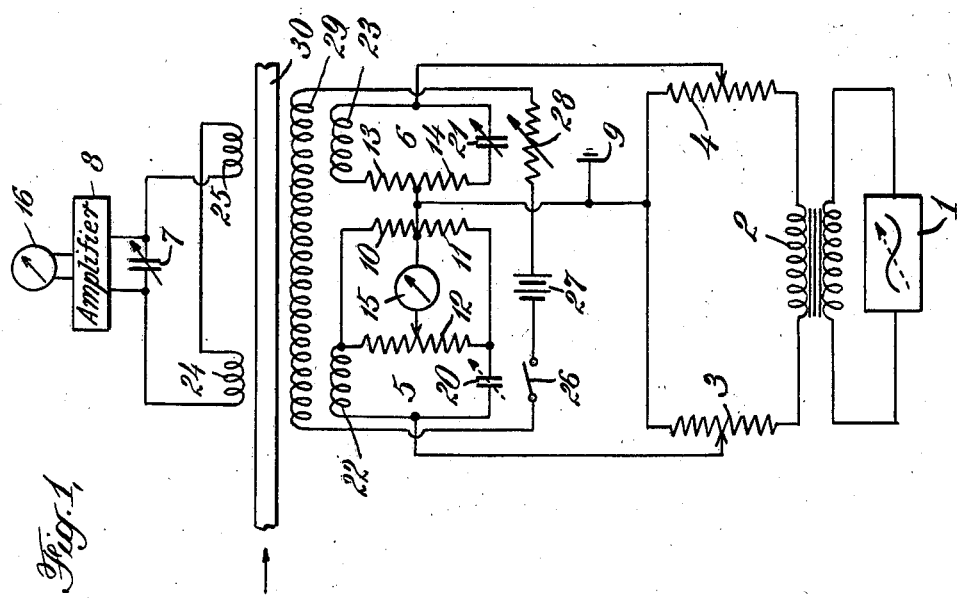
INVENTOR
Theodore Zuschlag
BY
Pennie, Davis, Marvin and Edmonds.
ATTORNEYS Patented Sept. 21, 1943

2,329,812

UNITED STATES PATENT OFFICE 2,329,812

ELECTROMAGNETIC INSPECTION WITH ALTERNATING CURRENT

Theodore Zuschlag, West Englewood, N. J., assignor to Magnetic Analysis Corporation, Long Island City, N. Y., a corporation of New York Application December 5, 1941, Serial No. 421,728

20 Claims. (Cl. 175—183)

This invention relates to the art of non-destructive testing and inspection of metallic material, especially by the use of alternating current fields energized from an independent current source subject to variations in frequency and in amplitude.

This application is a continuation in part of my application Serial No. 415,551, filed October 18, 1941.

It has heretofore been recognized that testing and inspection of metallic material by apparatus energized from an external and independent current source is frequently convenient, and, by enabling a greater amount of power to be economically applied to the inspection coils, permits of greatly amplified indications of extremely small defects and variations in the material. However, the use of such current sources has been unsatisfactory, even though the frequency thereof may be controllable, because there is always the tendency towards a drifting away from synchronism between the frequency of the tuned circuits in the testing apparatus and the frequency of the source, which results in false indications of defects or variations in the material. Furthermore, testing apparatus heretofore proposed for the present purposes is usually sensitive to unintentional changes in amplitude of the output voltage of the current source, and this again results in false indications.

The present invention makes available to the art a reliable and sensitive testing and inspection system which may be energized by a single and independent source of alternating current of any required power, without concurrent risk of false indications due to voltage fluctuations or frequency drift.

The specific system which in accordance with the invention provides an immediate indication of non-synchronism between the tuned testing circuits and the current source is broadly applicable to other and different uses where a tuning or synchronism indicator is desired.

A better understanding of the present invention may be had from consideration of the following description taken together with the drawing wherein:

Fig. 1 is a circuit diagram of one embodiment of the invention in which the resonance-indicating circuit is employed in an inspecting system which is energized by a single alternating-current source of independent frequency; and Fig. 2 is a circuit diagram of a preferred embodiment of the invention which includes components introducing further advantages.

Referring first to Fig. 1, a suitable source of alternating current 1, which may, for example, be a vacuum tube oscillator or a motor generator, is coupled through an output transformer 2 to a voltage supply circuit which includes the secondary of transformer 2 and two potentiometers 3 and 4. The sliders of these potentiometers are connected to two tuned circuits 5 and 6. Circuit 6 may be termed an energizing circuit and includes energizing primary coil 23 across which is connected variable tuning condenser 21. This coil and condenser are connected together on one side each through a resistance element 13, 14 of sufficiently low value as to introduce no appreciable change in the tuning characteristics of the circuit for the purpose intended.

The slider of potentiometer 3 is connected to tuned circuit 5 which comprises an auxiliary circuit including auxiliary primary coil 22 and parallel tuning condenser 20. If the current source 1 is of controllable frequency, condenser 20 may ordinarily be of fixed or semi-fixed type, although it may be of variable type similar to that of condenser 21. For this reason the arrow drawn through condenser 20 is represented by a dotted line. As shown in the drawing, coil 22 and condenser 20 are connected together through resistance 10, 11 which should be the same as resistance 13, 14, and divided at the center, as shown, at a junction point which is connected to the corresponding junction point of the resistance portions 13 and 14. This common terminal or junction point is connected to ground 9, and also completes the return connection to the current supply circuit previously mentioned.

In the auxiliary circuit there is also shown a potentiometer 12, the slider of which is connected to the junction point of resistance portions 10 and 11 through an indicating device 15 which may for example comprise a microammeter responsive to alternating current of the frequency employed. The resistance value of potentiometer 12 should be considerably higher than the resistance of the parallel arm 10, 11. For example, it might be of the order of 1,000 times as great. However, the actual resistance of this potentiometer would be determined at least in part by the effective resistance of the indicating device or meter 15, usually being of about the same order of magnitude. In any event, the resistance of the potentiometer should be great enough not to interfere substantially with the tuning characteristics of the auxiliary circuit in which it is connected.

When current source 1 is of adjustable frequency it is not always necessary that the connection between meter 15 and an intermediate point on resistance 12 be adjustable. For some purposes, therefore, resistance 12, while preferably of much higher resistance value than the value of resistance portions 10 and 11 together, nevertheless may be the same as that of the arm 10, 11 in the sense that the intermediate, usually the center, point of each may be fixed.

While potentiometer 12 is represented as comprising a simple resistance, it should be understood that this representation is by way of example only, because this element could be replaced by a suitable equivalent, such as a vacuum tube, the grid being connected to the sliding contact, the plate to the right-hand terminal of coil 22 and the cathode to the right-hand terminal of condenser 20. An equivalent connection of such a vacuum tube is represented by amplifier 6 of Fig. 1 of my mentioned prior application, although in that instance the vacuum tube is not employed in connection with a resonance indicator.

Energizing primary coil 23 and auxiliary primary coil 22 are symmetrically coupled, respectively, to detector coils 24 and 25 connected in a detector circuit which preferably may include in series with those detector coils a variable tuning condenser 7. Coils 24 and 25 are coupled to coils 22 and 23 with such polarity and to such degree that the voltage induced in coil 25 will be opposed and may be balanced by the voltage induced in coil 24. It is this balanced conditton which is upset by the presence of a variation or defect in the material under test when it is moved within the field of one or both of these coils.

Across the terminals of tuning condenser 7 an amplifier 8 is shown connected, and to the output of this amplifier is connected a suitable indicating device 16. This device may be a milliammeter of either the direct or alternating current type depending upon the type of amplifier 8 employed. If it be of the direct-current type, the amplifier element 8 may include a rectifier as well. Alternatively, indicating device 16 may be of the oscillograph type, as disclosed in my copending application Serial No. 417,976, filed November 6, 1941.

Also included in the coil system is a direct-current energizing coil 29 connected in series with a source of direct current 27, a control switch 26 and a rheostat 28 which is variable to control the strength of the direct-current magnetic field set up by the coil 29. The manner of use of this direct-current circuit will be described later. Coils 22, 23, 24, 25 and 29 are preferably disposed in a symmetrical assembly and arranged to be placed in inductive relation to an article to be tested, as represented by the bar 30. Usually this material under test would be placed either within the mentioned coils (in which case the frequency of the source 1 may be of, say, 3,000–5,000 cycles) or symmetrically adjacent them so that the material under test passes through their fields (in which case the frequency may be of, say, 10,000–20,000 cycles), as shown in Figs. 3, 4, 6 and 7 of my mentioned application Serial No. 415,551.

The system of Fig. 1 is adjusted as follows: Assuming first that the frequency of the alternating-current source can be suitably adjusted, then, with a standard specimen of material within the fields of the coil assembly, the frequency of the generator 1 is adjusted after a suitable setting of the potentiometer 12 has been found, until meter 15 shows a pronounced minimum reading. This assumes that the capacity of condenser 20 has already been set so that the resonant frequency of circuit 5 will come within the frequency limits within which source 1 is adjustable. While making the foregoing adjustments it may be necessary to increase or decrease the amplitude of alternating-current voltage supplied to tuned circuit 5 and its associated net-work by adjustment of potentiometer 3. The result of the adjustment above described will be that the tuned auxiliary circuit 5 will be tuned to the frequency of the source 1, and because of the circuit arrangement which constitutes part of this invention, these conditions of resonance will be maintained as long as the meter 15 continues to indicate a minimum deflection.

Next, variable condenser 21, of tuned energizing circuit 6, and potentiometer 4 may be adjusted until a minimum reading is observed on indicating device 16. At this time, variable tuning condenser 7 should also be adjusted until it is seen that the detector circuit is in resonance with the frequency of the energizing current by a maximum deflection of meter 16. Final adjustment of elements 21 and 4 should be made after condenser 7 is adjusted.

If now an unknown specimen of material 20 is substituted for the standard specimen and is moved through the fields of the coils, the output of amplifier 8 will cause indicating device 16 to indicate a minimum reading, probably a reading of substantially zero if the material is perfect and uniform. As soon as a defect or otherwise different section of material enters the fields of coils 22 and 24 (assuming movement from left to right as indicated by the arrow) the balance previously established in the detector circuit is upset, and a deflection of indicating device 16 will be noted. The amount of this deflection depends not only upon the nature of the disturbance of the fields, but also upon the nature of the defect and its effect upon the apparent inductances of the coils through the fields of which the defect is passing.

Inasmuch as meter 15 will record any deviation from resonance between the tuned circuits and the current source 1, defects passing through the fields of the coils will cause certain deflections of meter 15, but meter 15 will not be affected by normal voltage fluctuations of source 1, although such voltage fluctuations will usually result in fluctuations of indicator 16. Therefore, the present invention makes practicable the use of a single source of alternating current which need not necessarily be of constant amplitude, because by observation of meters 15 and 16 the operator can distinguish between fluctuations due to defects in the material under test and fluctuations due to changes in amplitude of the source of energizing current. In this connection it should be pointed out that tuning indicator 15 should not be relied upon as a defect indicator. The defects encountered in commercial inspection, with a few exceptions, are not sufficiently pronounced to cause more than a very minor change in the electrical characteristics of coil 22, and such a minor change will not cause more than a slight rearrangement of the voltage distribution in the resistance bridge network 10—11, 12, resulting in a very small deflection of meter 15. On the other hand, extreme defects, especially when they occur as variations in anlysis of the material under test, may cause a noticeable deflection of meter 15. However, as above indicated, if meter 16 is always read for defects in the material under test, and meter 15 is always read only as a check on the condition of resonance, the operator may be continuously aware not only of the presence or absence of defects, but also of the tuning adjustments and conditions of resonance of the apparatus.

The system of the present invention is, as previously noted, also adapted to be operated from a source of non-adjustable frequency. While under those circumstances it is desirable that such current sources be of uniform frequency, the apparatus according to the invention will give an immediate indication if the frequency of the source changes with respect to the tuning of the energizing and auxiliary circuits, and thus false indications of defects will be recognizable, and immediate retuning of those circuits or other necessary compensation may be effected.

Accordingly, in the event that the frequency of the current source is not conveniently adjustable, the procedure of adjusting the system would, in general, follow that above described, except that tuned circuits 5 and 6 would be initially tuned to be in resonance with the frequency of the source by adjustment of variable condensers 20 and 21. During the adjustment of circuit 5, meter 15 would be observed for minimum reading after an appropriate setting of potentiometer 12 is found. Condenser 21 would be adjusted while observing meter 16 as previously described.

The apparatus herein described may be used to inspect specimens or material of any uniform cross-section and of any kind of metallic material. It may also be employed to indicate non-uniformity of cross-section. When inspecting non-ferrous or non-magnetic material it is not necessary to use direct-current energizing coil 29, but when testing magnetic material, the superposition of a direct-current field has a very definite effect on the test specimen under observation because without the superposition of a direct-current field, slight but meaningless changes in the permeability of the material may be excessive and produce misleading meter deflections. Such undesired deflections can be reduced to insignificant values by the superposition of a relatively weak direct-current field. In this case if coil 29 is of 4,000 or 5,000 ampere turns, it would be sufficient. A more complete discussion of the use of a direct-current field in connection with testing equipment of the general nature of that herein described is given in my copending application Serial No. 415,551, above referred to.

The system of Fig. 2 is a preferred embodiment of the present invention because it includes certain advantages over the system disclosed in Fig. 1. By means of the preferred embodiment it is possible to indicate the full length of flaws passing through the test coils. In that respect the system differs from that of Fig. 1 which indicates the beginning and end of a continuous defect, such as a longitudinal crack, but does not indicate continuously the presence of the crack while it is passing through the test coils. Accordingly, the system of Fig. 2 also indicates other persistent conditions which differ from any standard for which the system is initially adjusted. This would include changes in the structure, composition and homogeneity of the material itself.

Referring now to Fig. 2, most of the circuit elements shown are identical with those of Fig. 1 above described. In both figures corresponding circuit elements have been given corresponding reference characters, and additional elements having functions similar to those of Fig. 1 have been given the same reference characters plus 100.

In Fig. 2, a second auxiliary circuit coupled to a secondary pick-up circuit has been added in order to provide for the additional indications above described. This second auxiliary circuit obtains its energizing current from the same current supply circuit 2, 3, 4 as before, but in this case an additional potentiometer 103 is shown connected in parallel with potentiometer 3. In the arrangement shown, the effective resistance of potentiometers 3 and 103 connected in parallel may be made equal to the resistance of potentiometer 4, but this is not essential.

Connected to the slider of potentiometer 103 is a second tunable auxiliary circuit including auxiliary primary coil 19 and tuning condenser 18. As before, tuning condenser 18 may be of the variable type if desired, but it should be variable if the frequency of the current source 1 is non-adjustable.

Coupled to primary 19 is a secondary coil 31, coils 19 and 31 being disposed so as to be not in inductive relation to the other coils of the assembly and so as to be not in inductive relation to the material under test. The secondary circuit in which coil 31 is connected includes also secondary coil 124 and secondary coil 125 which are coupled respectively to auxiliary primary coil 22 and energizing primary coil 23. This secondary circuit includes in series with the three coils just mentioned variable tuning condenser 107 which corresponds to tuning condenser 7 described in connection with Fig. 1, and is used for the same purpose, namely, to increase the potential variations resulting from the presence of defects in the material under test and to exclude from the indicating circuit, as far as possible, potentials due to frequencies, such as harmonics, other than those desired to be indicated. Secondary coils 124 and 125 are so disposed and coupled to primary coils 22 and 23 that the voltages induced therein are in opposition to the voltage induced in coil 31 by coil 19. Consideration of Fig. 2 will show, therefore, that because a coil in each of the three systems mentioned (energizing and first and second auxiliary) is connected in a circuit coupled to the other systems, the balance of all the systems combined depends not only upon the balance in the separate systems but also upon the balance between the systems. This interrelated balance provides an interrelated response, and sensitivity different from that of either system alone and superior to the mere summation of the individual systems.

In adjusting the apparatus of Fig. 2 it will usually be found convenient to follow the adjusting procedure outlined in connection with the system of Fig. 1, and subsequently to adjust condensers 18 and 107 as well as potentiometer 103, as required. The use of the direct-current energizing circuit including coil 29, battery 27, control switch 26 and control rheostat 28, may be identical with that described in connection with Fig. 1. By observing meters 16 and 116, as well as meter 15 to check on the condition of resonance, defects of all types as well as changes in composition or form of the material under test can be instantly observed and identified as to type even in minute instances.

What is claimed is:

1. In apparatus for electromagnetic inspection of material, the combination which comprises a source of alternating current, a tuned energizing circuit including an energizing coil and a tuning condenser, a tuned auxiliary circuit including an auxiliary coil and a tuning condenser, a coupling system connected between said source and said tuned circuits, said coupling system including a bridge network comprising resistances connected in symmetrical relation in each of said tuned circuits, a detector circuit including coils coupled to the coils in said tuned circuits, and an indicating device coupled to said detector circuit.

2. In apparatus for electromagnetic inspection of material, the combination which comprises a source of alternating current, a tuned energizing circuit including an energizing coil and a tuning condenser, a tuned auxiliary circuit including an auxiliary coil and a tuning condenser, a coupling system connected between said source and said tuned circuits, said coupling system including a bridge network comprising resistances connected in symmetrical relation in each of said tuned circuits, a detector circuit including coils coupled to the coils in said tuned circuits, an indicating device coupled to said detector circuit, and means for adjusting the frequency of said current source.

3. In apparatus for electromagnetic inspection of magnetic material, the combination which comprises a source of alternating current, a tuned energizing circuit including an energizing coil and a variable tuning condenser, a tuned auxiliary circuit including an auxiliary coil and a tuning condenser, a coupling system connected between said source and said tuned circuits, said coupling system including a bridge network comprising resistances connected in symmetrical relation in each of said tuned circuits, a detector circuit including coils coupled to the coils in said tuned circuits, an indicating device coupled to said detector circuit, means for adjusting the frequency of said current source, a direct-current coil, means for passing adjustably controllable direct current therethrough, and means for passing said material through the fields of said tuned-circuit coils, said detector-circuit coils and said direct-current coil.

4. In apparatus for electromagnetic inspection of material, the combination which comprises a source of alternating current, a tuned energizing circuit including an energizing coil and a variable tuning condenser, a tuned auxiliary circuit including an auxiliary coil and a tuning condenser, a coupling system connected between said source and said tuned circuits, said coupling system including a bridge network comprising a plurality of resistances of substantially equal values connected in symmetrical relation in each of said tuned circuits, a detector circuit including detector coils coupled to said coils in said tuned circuits, means in said coupling system for adjusting the magnitude of alternating voltage impressed on said tuned circuits, means for adjusting the frequency of the current from said source, and an indicating device coupled to said detector circuit.

5. In apparatus for electromagnetic inspection of material, the combination which comprises a source of alternating current, a tuned energizing circuit including an energizing coil and a variable tuning condenser, a tuned auxiliary circuit including an auxiliary coil and a tuning condenser, a detector circuit including detector coils coupled to said coils in said tuned circuits with such polarity that voltages induced in said detector coils are in opposition, a first indicating device coupled to said detector circuit, a coupling system connected between said source and said tuned circuits, said coupling system including a bridge network comprising a plurality of resistances connected in symmetrical relation to said tuned circuits, certain of said resistances serving to complete said tuned circuits, the portion of said network connected in said auxiliary circuit comprising two parallel arms, the center point of one arm being connected through a second indicating device to a contact adjustable on the other arm, and means in said coupling system for adjusting the amplitude of alternating voltage impressed on at least one of said tuned circuits.

6. In apparatus for electromagnetic inspection of material, the combination which comprises a source of alternating current, a tuned energizing circuit including an energizing coil and a variable tuning condenser, a tuned auxiliary circuit including an auxiliary coil and a tuning condenser, a detector circuit including detector coils coupled to said coils in said tuned circuits with such polarity that voltage induced in said detector coils are in opposition, a first indicating device coupled to said detector circuit, a coupling system connected between said source and said tuned circuits, said coupling system including a bridge network comprising a plurality of resistances connected in symmetrical relation to said tuned circuits, certain of said resistances serving to complete said tuned circuits, the portion of said network connected in said auxiliary circuit comprising two parallel arms, a connection including a second indicating device between an intermediate point on one arm and an intermediate point on the other arm such that a minimum current will flow through said second indicating device when said energizing and auxiliary coils are resonant to the frequency of said source, and means in said coupling system for adjusting the amplitude of alternating voltage impressed on at least one of said tuned circuits.

7. In apparatus for electromagnetic inspection of material, the combination which comprises a source of alternating current of adjustable frequency, a tuned energizing circuit including an energizing coil and a variable tuning condenser, a tuned auxiliary circuit including an auxiliary coil and a tuning condenser, a detector circuit including detector coils coupled to said coils in said tuned circuit with such polarity that voltages induced in said detector-circuit coils are in opposition, a first indicating device coupled to said detector circuit, a coupling system connected between said source and said tuned circuits, said coupling system including a bridge network comprising a plurality of resistances connected in symmetrical relation to said tuned circuits, certain of said resistances serving to complete said tuned circuits, the portion of said network connected in said auxiliary circuit comprising two parallel arms, the center point of one arm being connected through a second indicating device to a center point on the other arm, means in said coupling system for adjusting the amplitude of alternating voltage impressed on at least one of said tuned circuits, and means for adjusting the frequency of said source.

8. In apparatus for electromagnetic inspection of material, the combination which comprises a source of alternating current, a tuned energizing circuit including an energizing coil and a tuning condenser adjustable to tune said energizing circuit to the frequency of said source, a tuned auxiliary circuit including an auxiliary coil and a tuning condenser adjustable to tune said auxiliary circuit to the frequency of said source, a detector circuit including detector coils coupled to said coils in said tuned circuits, a first indicating device coupled to said detector circuit, a coupling system connected between said source and said tuned circuits, said coupling system including a bridge network comprising a plurality of resistances connected in symmetrical relation to said tuned circuits, certain of said resistances serving to complete said tuned circuits, the portion of said network connected in said auxiliary circuit comprising two parallel arms, the center point of one arm being connected through a second indicating device to a contact adjustable on the other arm, and means in said coupling system for adjusting the amplitude of alternating voltage impressed on said energizing circuit.

9. In apparatus for electromagnetic inspection of material, the combination which comprises a source of alternating current, a tuned energizing circuit including an energizing coil and a tuning condenser adjustable to tune said energizing circuit to the frequency of said source, a tuned auxiliary circuit including an auxiliary coil and a tuning condenser adjustable to tune said auxiliary circuit to the frequency of said source, a detector circuit including detector coils coupled to said coils in said tuned circuits, a first indicating device coupled to said detector circuit, a coupling system connected between said source and said tuned circuits, said coupling system including a bridge network comprising a plurality of resistances connected in symmetrical relation to said tuned circuits, certain of said resistances serving to complete said tuned circuits, the portion of said network connected in said auxiliary circuit comprising two parallel arms, a connection including a second indicating device between an intermediate point on one arm and an intermediate point on the other arm such that minimum current will flow through said second indicating device when said energizing and auxiliary circuits are tuned to resonance with the frequency of said source, and means in said coupling system for adjusting the amplitude of alternating voltage impressed on said energizing circuit.

10. In apparatus for the inspection of magnetic material, the combination which comprises a source of alternating current, a tuned energizing circuit including an energizing coil and a variable tuning condenser, a tuned auxiliary circuit including an auxiliary coil and a tuning condenser, a detector circuit including detector coils coupled to said coils in said tuned circuits with such polarity that voltages induced in said detector coils are in opposition, a variable condenser connected in said detector circuit in series with said detector coils, an indicating device coupled across said last-named variable condenser, a coupling system connected between said source and said tuned circuits, including a voltage supply circuit coupled to said source, said supply circuit including a potentiometer connected to each of said tuned circuits, each said potentiometer being adjustable to control the amplitude of the alternating current impressed upon the tuned circuit connected thereto, said coupling system also including a bridge network comprising a plurality of resistances connected in symmetrical relation to said energizing and auxiliary circuits, certain of said resistances serving to complete said energizing circuit and said auxiliary circuit, the portion of said network connected in said auxiliary circuit comprising two parallel arms, and a connection from an intermediate point on one arm to a contact adjustable on the other arm such that minimum current will flow through said connection when said energizing and auxiliary circuits are tuned to resonance, said connection including an indicating meter responsive to the current flowing through said connection, a direct-current coil and means for passing adjustably controllable direct current therethrough, and means for passing said material through the fields of said tuned-circuit coils, said detector-circuit coils and said direct-current coils.

11. In apparatus for the inspection of magnetic material, the combination which comprises a source of alternating current, a tuned energizing circuit including an energizing coil and a variable tuning condenser, a tuned auxiliary circuit including an auxiliary coil and a tuning condenser, a detector circuit including detector coils coupled to said coils in said tuned circuits with such polarity that voltages induced in said detector coils are in opposition, a variable condenser connected in said detector circuit in series with said detector coils, an indicating device coupled across said last-named variable condenser, a coupling system connected between said source and said tuned circuits including a voltage supply circuit coupled to said source, said supply circuit including in series the secondary of a transformer and two potentiometer resistances, the adjustable contact of one said potentiometer being connected to said energizing circuit and the adjustable contact of the other said potentiometer being connected to said auxiliary circuit whereby to impress an alternating current of adjustable amplitude on said circuits respectively, said coupling system also including a bridge network comprising a plurality of resistances connected in symmetrical relation to said energizing and auxiliary circuits, one of said resistances being connected to complete said energizing circuit and two of said resistances being connected in parallel, one of said parallel resistances being connected to complete said auxiliary circuit, a connection from an intermediate point on a first of said parallel-connected resistances to an adjustable contact on the second of said parallel-connected resistances, said first resistance being of considerably lower resistance value than said second resistance, such that minimum current will flow through said connection when said energizing and auxiliary circuits are tuned to resonance with the frequency of said source, said connection including an indicating meter responsive to the current through said connection, a connection in common from an intermediate point on the resistance in said energizing circuit and from an intermediate point on the first of said parallel-connected resistances to a point in said voltage supply circuit between said potentiometers, a direct-current coil and means for passing adjustably controllable direct current therethrough, and means for passing said material through the fields of said tuned-circuit coils, said detector-circuit coils and said direct-current coil.

12. In apparatus for electromagnetic inspection of material, the combination which comprises a source of alternating current, a tuned energizing circuit including an energizing coil and a variable condenser, a first tuned auxiliary circuit including a first auxiliary coil and a first tuning condenser, a second tuned auxiliary circuit including a second auxiliary coil and a second tuning condenser, a detector circuit including two detector coils coupled respectively to the coils in said energizing and first auxiliary circuits with such polarity that voltages induced in said detector coils are in opposition, a secondary circuit including first, second and third secondary coils coupled respectively to said energizing coil, said first auxiliary coil and said second auxiliary coil, a first indicating device coupled to said detector circuit and a second indicating device coupled to said secondary circuit, a coupling system connected between said source and said tuned circuits, said coupling system including a bridge network comprising a plurality of resistances connected in symmetrical relation to said energizing and first auxiliary circuits, certain of said resistances serving to complete said energizing circuit and said first auxiliary circuit, the portion of said network connected in said first auxiliary circuit comprising two parallel arms, an intermediate point of one arm being connected through a third indicating device to a contact adjustable on the other arm, and means for adjusting the amplitude of alternating voltage impressed on each of said tuned circuits.

13. In apparatus for inspection of magnetic material, the combination which comprises a source of alternating current; a tuned energizing circuit including an energizing coil and a first variable condenser; a first tuned auxiliary circuit including a first auxiliary coil and a first tuning condenser; a second tuned auxiliary circuit including a second auxiliary coil and a second tuning condenser; a detector circuit including two detector coils coupled respectively to the coils in said energizing and first auxiliary circuits with such polarity that voltages induced in said detector coils are in opposition, said detector coils being connected in said detector circuit in series with a second variable condenser; a secondary circuit including first, second and third secondary coils coupled respectively to said energizing coil, said first auxiliary coil and said second auxiliary coil, said secondary coils being connected in series with a third variable condenser and related to the coils with which they are coupled with such polarity that voltages induced in said first and second secondary coils are in opposition to the voltage induced in said third secondary coil; a first indicating device coupled across said second variable condenser; a second indicating device coupled across said third variable condenser; and a coupling system connected between said source and said tuned circuits including a voltage supply circuit coupled to said source, said supply circuit including three potentiometers, one each being connected to impress alternating current of adjustable amplitude on said tuned circuits respectively, said coupling system also including a bridge network comprising a plurality of resistances connected in symmetrical relation to said energizing and first auxiliary circuits, certain of said resistances serving to complete said energizing circuit and first auxiliary circuit, the portion of said network connected in said first auxiliary circuit comprising two parallel arms, the center point of one arm being connected through a third indicating device to a contact adjustable on the other arm.

14. Apparatus for inspection of magnetic material according to claim 13 wherein said network resistances serving to complete said energizing and first auxiliary circuits are of low resistance values and are of resistance values considerably lower than that of the resistance of said parallel arm associated with said adjustable contact.

15. In apparatus for inspection of magnetic material, the combination which comprises a source of alternating current; a tuned energizing circuit including an energizing coil and a first variable condenser; a first tuned auxiliary circuit including a first auxiliary coil and a first tuning condenser; a second tuned auxiliary circuit including a second auxiliary coil and a second tuning condenser; a detector circuit including two detector coils coupled respectively to the coils in said energizing and first auxiliary circuits with such polarity that voltages induced in said detector coils are in opposition, said detector coils being connected in said detector circuit in series with a second variable condenser; a secondary circuit including first, second and third secondary coils coupled respectively to said energizing coil, said first auxiliary coil and said second auxiliary coil, said secondary coils being connected in series with a third variable condenser and related to the coils with which they are coupled with such polarity that voltages induced in said first and second secondary coils are in opposition to the voltage induced in said third secondary coil; a first indicating device coupled across said second variable condenser; a second indicating device coupled across said third variable condenser; a coupling system connected between said source and said tuned circuits including a voltage supply circuit coupled to said source, said supply circuit including three potentiometers, one each being connected to impress alternating current of adjustable amplitude on said tuned circuits respectively, said coupling system also including a bridge network comprising a plurality of resistances connected in symmetrical relation to said energizing and first auxiliary circuits, certain of said resistances serving to complete said energizing circuit and first auxiliary circuit, the portion of said network connected in said first auxiliary circuit comprising two parallel arms, the center point of one arm being connected through an indicating meter to a contact adjustable on the other arm, a direct-current coil and means for passing controlled direct current therethrough, and means for passing said material through the fields of said energizing and first auxiliary coils, said detector coils, said first and second secondary coils and said direct-current coil.

16. Apparatus for inspection of magnetic material according to claim 15 wherein said network resistances serving to complete said energizing and first auxiliary circuits are of low resistance values and are of resistance values considerably lower than that of the resistance of said parallel arm associated with said adjustable contact.

17. Apparatus for inspection of magnetic material according to claim 15 wherein the resistance values of said network resistances serving to complete said energizing and first auxiliary circuits are each of low and substantially equal value, and are considerably lower than the resistance value of said parallel arm associated with said adjustable contact.

18. In combination, a source of alternating current, a tuned circuit including an inductance coil and a condenser connected together on one side each at a junction point, and means for ascertaining when said circuit is tuned to the frequency of said source comprising a first resistance connected between said coil and condenser at the other side of each and serving to complete said tuned circuit, a second resistance connected in parallel with said first resistance, an adjustable contact on said second resistance, an indicating meter connected between said contact and an intermediate point on said first resistance, and means for impressing a voltage from said source across said junction point and said intermediate point.

19. In combination, a source of alternating current, a tuned circuit including an inductance coil and a condenser each having two terminals, one terminal of each being connected together at a junction point, and means for ascertaining when said circuit is tuned to the frequency of said source comprising a first resistance of low value connected between the remaining terminals of said coil and condenser and serving to complete said tuned circuit, a second resistance of a value considerably higher than that of said first resistance and connected in parallel therewith, an adjustable contact on said second resistance, an indicating meter connected between said contact and a center point on said first resistance, and means for impressing a voltage from said source across said junction point and said center point.

20. In apparatus for electromagnetic inspection of material, the combination which includes, an alternating current source of independently adjustable frequency, a tuned energizing circuit, a tuned auxiliary circuit of normally similar electrical characteristics, a detector circuit coupled to both of said circuits, means for supplying a voltage at the frequency of said source across two center points of each of said tuned circuits, means for adjusting the frequency of said source to be resonant with the tuned frequency of said circuits, means for balancing a voltage induced in said detector circuit from said energizing circuit against a voltage induced from said auxiliary circuit, means for passing material to be inspected in inductive relation to elements of said energizing and auxiliary circuits, and an indicating device coupled to said detector circuit.

THEODORE ZUSCHLAG.